United States Patent
Zhu et al.

(10) Patent No.: US 9,476,778 B2
(45) Date of Patent: Oct. 25, 2016

(54) RECHARGEABLE BATTERY TEMPERATURE DETECTION METHOD, POWER MANAGEMENT DEVICE AND ELECTRONIC SYSTEM

(71) Applicant: Wistron Corporation, New Taipei (TW)

(72) Inventors: Yu-Tzu Zhu, New Taipei (TW); Ping-I Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 367 days.

(21) Appl. No.: 14/243,874

(22) Filed: Apr. 2, 2014

(65) Prior Publication Data

US 2015/0145467 A1  May 28, 2015

(30) Foreign Application Priority Data

Nov. 22, 2013 (TW) .............................. 102142630 A (51) Int. Cl.
| | |
|---|---|
| H02J 7/00 | (2006.01) |
| G01K 7/22 | (2006.01) |
| G01K 13/00 | (2006.01) |
| H01M 10/48 | (2006.01) |

(52) U.S. Cl.
CPC .............. G01K 7/22 (2013.01); G01K 13/00 (2013.01); H01M 10/486 (2013.01)

(58) Field of Classification Search
CPC .......... H01M 10/486; H01M 10/443; H01M 10/425; H01M 10/4257; H01M 10/46; H01M 10/48; H01M 10/482; H01M 2220/30; H02J 7/047; H02J 2007/0098; H02J 7/007; H02J 7/0091; B60L 2240/545; G01K 7/22; G01K 13/00
See application file for complete search history.

(56) References Cited

U.S. PATENT DOCUMENTS

| | | | |
|---|---|---|---|
| 9,059,596 B2 | 6/2015 | Chou | |
| 2005/0206347 A1* | 9/2005 | Seo | B60L 3/0046 320/150 |
| 2012/0004875 A1 | 1/2012 | Maeda | |

(Continued)

FOREIGN PATENT DOCUMENTS

| | | |
|---|---|---|
| CN | 103384071 A | 11/2013 |
| TW | 201141000 | 11/2011 |
| TW | 201347355 | 11/2013 |

OTHER PUBLICATIONS

Office action mailed on Oct. 29, 2014 for the Taiwan application No. 102142630, filing date: Nov. 22, 2013, p. 1 line 11-14, p. 2-3 and p. 4 line 1-23.

(Continued)

*Primary Examiner* — Nha Nguyen
(74) *Attorney, Agent, or Firm* — Winston Hsu; Scott Margo (57) ABSTRACT

A rechargeable battery temperature detection method adapted to an electronic system includes detecting a status of a processor of the electronic system when an external power is input to a power conversion module of the electronic system; determining whether a thermistor of the electronic system is conducted to a fuel gauge or a charge control circuit according to the state of the processor such that the fuel gauge or the charge control circuit determine a temperature sensing result via the thermistor. The thermistor is disposed adjacent to a rechargeable battery and has a resistance which varies with a temperature of the rechargeable battery. The temperature sensing result is related to the resistance.

25 Claims, 5 Drawing Sheets (56) References Cited

U.S. PATENT DOCUMENTS

2012/0274269 A1* 11/2012 Ohkuma ............... H02J 7/047
320/107
2013/0293186 A1 11/2013 Chou

OTHER PUBLICATIONS

Office action mailed on May 10, 2016 for the China application No. 201310661406.X, p. 3 line 2-31, p. 4-8 and p. 9 line 1-11.

* cited by examiner

RECHARGEABLE BATTERY TEMPERATURE DETECTION METHOD, POWER MANAGEMENT DEVICE AND ELECTRONIC SYSTEM

BACKGROUND OF THE INVENTION

1. Field of the Invention

The present invention relates to a rechargeable battery temperature detection method, a power management device and an electronic system, and more particularly, to a rechargeable battery temperature detection method, a power management device and an electronic system that can switch circuits according to states of a processor in order to prevent temperature of a rechargeable battery from being out of control.

2. Description of the Prior Art

Along with the ever-increasing popularity of portable electronic devices, demand for a rechargeable battery has grown dramatically in recent years. When recharging a rechargeable battery, however, the electric current passing through will release heat (known as joule heating), which causes the rechargeable battery to become hot. If the rechargeable battery becomes too hot, it may experience thermal runaway, become damaged, or even explode. To ensure charging safety, a thermistor may be disposed in the portable electronic device in proximity to the rechargeable battery and adapted for a fuel gauge to detect temperature of the rechargeable battery. The fuel gauge determines the temperature of the rechargeable battery according to the resistance of the thermistor, and sends a temperature sensing result to the processor. The processor then transmits the temperature sensing result to the charging control circuit, which can control a magnitude of a charging current flowing from a charging circuit to the rechargeable battery to prevent thermal runaway.

The temperature sensing results detected by the fuel gauge must be ceaselessly transmitted to the charging control circuit through the processor. If the processor crashes, the charging control circuit cannot adjust the charging current according to the temperature sensing result, and charging safety will be put at risk. Moreover, in order to ensure that the charging control circuit can accurately determine the temperature of the rechargeable battery even when the portable electronic device is in a sleeping or a shutdown state, the processor must consume certain amounts of electricity to transmit the temperature sensing result to the charging control circuit. Accordingly, ensuring charging safety and saving power even when the processor is executed in different states is a main objective in the field.

SUMMARY OF THE INVENTION

Therefore, it is one of the objectives of the disclosure to provide a rechargeable battery temperature detection method, a power management device and an electronic system, which can switch circuits according to states of a processor, thereby preventing temperature of a rechargeable battery from being out of control whether the processor is operated in a working state or not.

An embodiment of the invention provides a rechargeable battery temperature detection method adapted to an electronic system. The rechargeable battery temperature detection method comprises detecting a state of a processor of the electronic system when an external power is input to a power conversion module of the electronic system; and determining whether electric currents are conducted between a thermistor of the electronic system and a fuel gauge or between the thermistor and a charging control circuit according to the state of the processor, wherein the fuel gauge or the charging control circuit determines a temperature sensing result via the thermistor; wherein the thermistor is disposed adjacent to a rechargeable battery and has a resistance which varies with a temperature of the rechargeable battery, and the temperature sensing result is related to the resistance.

An embodiment of the invention provides a power management device adapted to an electronic system. The power management device comprises a thermistor, disposed adjacent to a rechargeable battery of the electronic system and having a resistance which varies with a temperature of the rechargeable battery; a fuel gauge, configured to calculate a charge storage capacity of the rechargeable battery and determine a temperature sensing result according to the resistance of the thermistor; a charging control circuit, configured to control how a charging circuit charges the rechargeable battery and determine the temperature sensing result according to the resistance of the thermistor; and a switch module, coupled between the thermistor, the fuel gauge and the charging control circuit and configured to conduct electric currents between the thermistor and a fuel gauge or between the thermistor and a charging control circuit according to a state of a processor of the electronic system, wherein the fuel gauge or the charging control circuit determines the temperature sensing result via the thermistor.

An embodiment of the invention provides an electronic system. The electronic system comprises a power conversion module, configured to output a direct current (DC) voltage; a processor; a rechargeable battery; a charging circuit, configured to receive the DC voltage from the power conversion module and provide a charging current for the rechargeable battery; and a power management device. The power management device comprises a thermistor, disposed adjacent to the rechargeable battery and having a resistance which varies with a temperature of the rechargeable battery; a fuel gauge, configured to calculate a charge storage capacity of the rechargeable battery and determine a temperature sensing result according to the resistance of the thermistor; a charging control circuit, configured to control how the charging circuit charges the rechargeable battery and determine the temperature sensing result according to the resistance of the thermistor; and a switch module, coupled between the processor, the thermistor, the fuel gauge and the charging control circuit and configured to conduct electric currents between the thermistor and a fuel gauge or between the thermistor and a charging control circuit according to a state of the processor, wherein the fuel gauge or the charging control circuit determines the temperature sensing result via the thermistor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
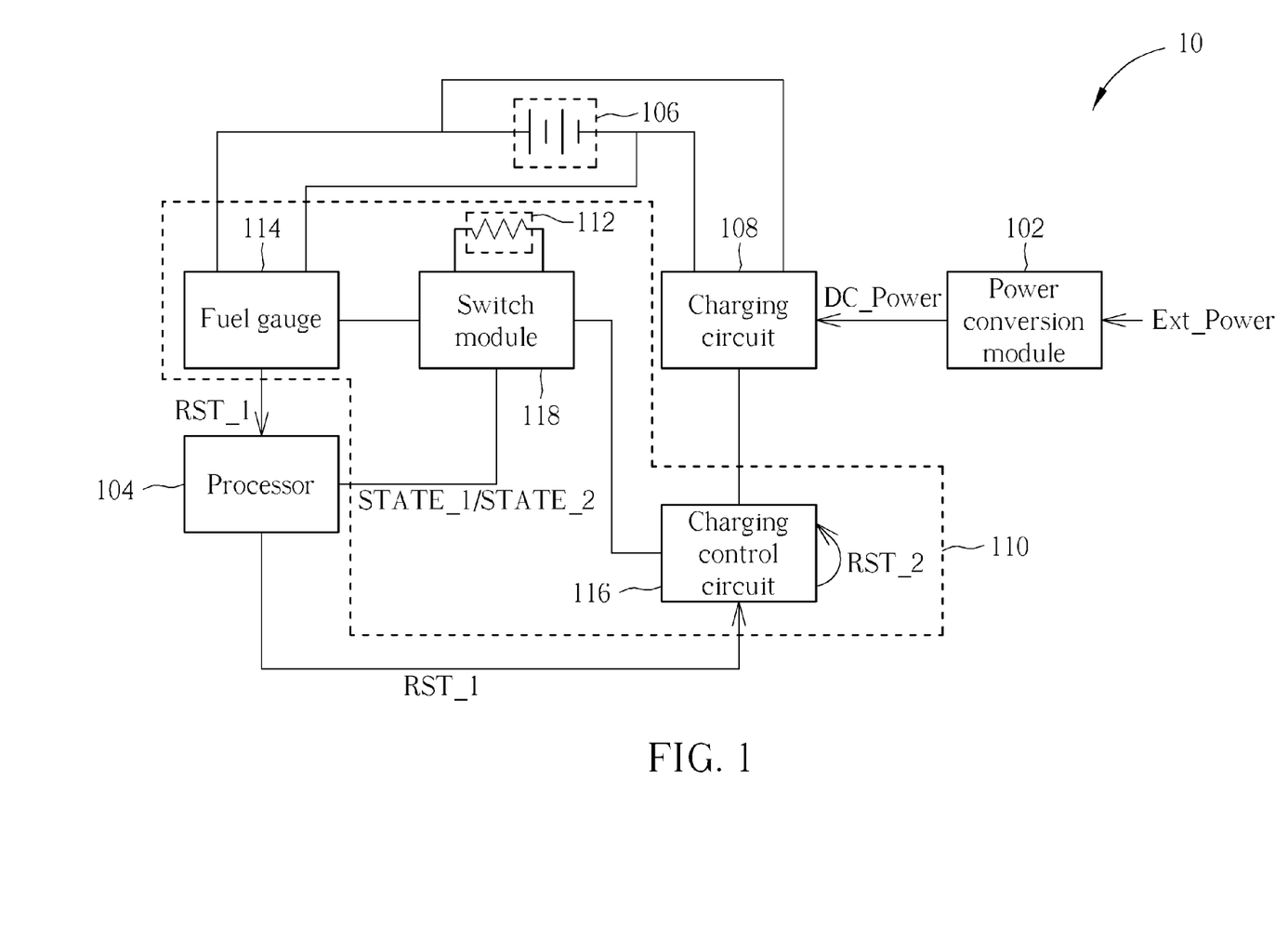
FIG. 1 is a schematic diagram illustrating an electronic system according to an embodiment of the invention.

Please refer to FIG. 1, which is a schematic diagram illustrating an electronic system 10 according to an embodiment of the invention. The electronic system 10 may be a portable electronic device or any electronic system with an independent power supply system such as a laptop, a smart phone, or a tablet. The electronic system 10 comprises a power conversion module 102, a processor 104, a rechargeable battery 106, a charging circuit 108 and a power management device 110. The power management device 110 comprises a thermistor 112, a fuel gauge 114, a charging control circuit 116 and a switch module 118. The thermistor 112 is disposed adjacent to the rechargeable battery 106, and resistance of the thermistor 112 can vary with temperature of the rechargeable battery 106. The fuel gauge 114 is utilized to calculate charge storage capacity of the rechargeable battery 106 and measure the resistance of the thermistor 112 so as to provide the charge storage capacity of the rechargeable battery 106 and temperature information for the processor 104. The power conversion module 102 can convert an external power Ext_Power (for example, an alternating current (AC) power) into a direct current (DC) power DC_Power and then provide the direct current power DC_Power to the charging circuit 108. The charging control circuit 116 can control the charging circuit 108 to convert the direct current power DC_Power into a proper charging current according to the temperature of the rechargeable battery 106, in order to charge the rechargeable battery 106. The switch module 118 is coupled between the thermistor 112, the fuel gauge 114 and the charging control circuit 116. The switch module 118 can detect state signals STATE_1, STATE_2 of the processor 104 by means of a pin on the processor 104; the switch module 118 can alternately conduct electric current between the thermistor 112 and the fuel gauge 114 or between the thermistor 112 and the charging control circuit 116 according to a state of the processor 104. Consequently, either the fuel gauge 114 or the charging control circuit 116 can determine the temperature sensing result RST_1 or RST_2 according to the resistance of the thermistor 112, wherein the temperature sensing results RST_1 and RST_2 relate to the temperature of the rechargeable battery 106.

More specifically, when an external power Ext_Power is input to the power conversion module 102—for example, a charger is plugged into the power conversion module 102 or a socket of the power conversion module 102—the switch module 118 conducts electric current between the thermistor 112 and the fuel gauge 114 when the switch module 118 detects the state signal STATE_1 from the processor 104 and determines that the processor 104 is operated in a working state. The fuel gauge 114 can thereby determine the temperature sensing result RST_1 according to the resistance of the thermistor 112. The fuel gauge 114 then sends the temperature sensing result RST_1 to the processor 104, and the processor 104 further transmits the temperature sensing result RST_1 to the charging control circuit 116, such that the charging control circuit 116 can control how the charging circuit 108 charges the rechargeable battery 106.

When the external power Ext_Power is input to the power conversion module 102, the switch module 118 conducts electric current between the thermistor 112 and the charging control circuit 116 when the switch module 118 detects the state signal STATE_2 from the processor 104 and determines that the processor 104 is not operated in a working state. The charging control circuit 116 can thereby determine the temperature sensing result RST_2 according to the resistance of the thermistor 112 and accordingly control how the charging circuit 108 charges the rechargeable battery 106. Therefore, when the electronic system 10 crashes, because the charging control circuit 116 is coupled to the thermistor 112, the charging control circuit 116 can still obtain the temperature sensing result RST_2 and accordingly control the charging circuit 108, thereby assuring charging safety. In addition, when the electronic system 10 is operated in a sleeping or a shutdown state, because the charging control circuit 116 is coupled to the thermistor 112, the processor 104 does not need to transmit the temperature sensing result from the fuel gauge 114 to the charging control circuit 116, thereby saving power.

Figure 2:
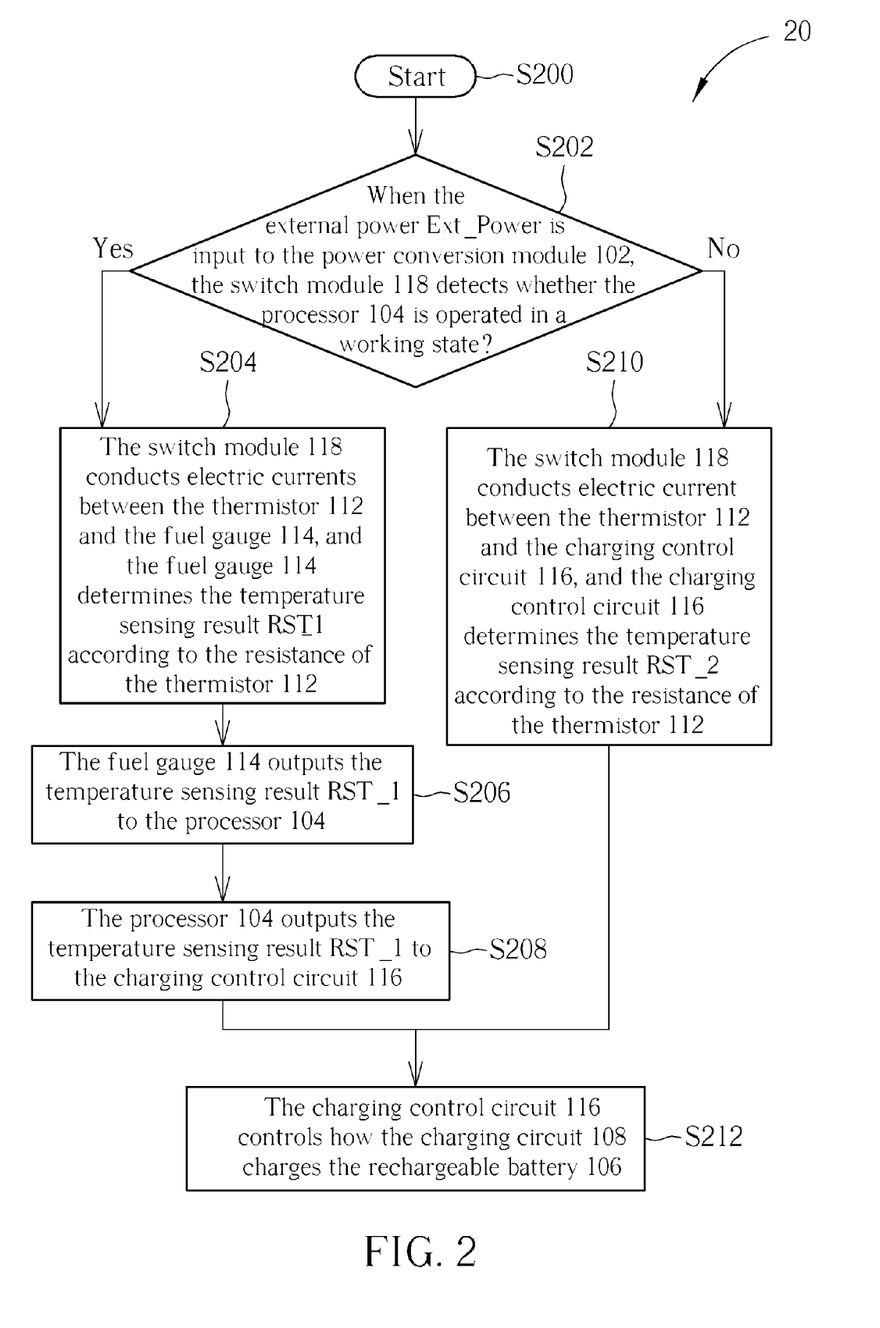
FIG. 2 illustrates a rechargeable battery temperature detection process according to an embodiment of the invention.

Via the switch module 118 coupled between the thermistor 112, the fuel gauge 114 and the charging control circuit 116, the power management device 110 can simultaneously assure charging safety and save energy. A related operation method can be summarized into a rechargeable battery temperature detection process 20 as shown in FIG. 2. The rechargeable battery temperature detection process 20 includes the following steps:

Step S200: start.

Step S202: when the external power Ext_Power is input to the power conversion module 102, the switch module 118 detects whether the processor 104 is operated in a working state. If yes, go to Step 204; otherwise, go to Step 210.

Step S204: the switch module 118 conducts electric current between the thermistor 112 and the fuel gauge 114, and the fuel gauge 114 determines the temperature sensing result RST_1 according to the resistance of the thermistor 112.

Step S206: the fuel gauge 114 outputs the temperature sensing result RST_1 to the processor 104.

Step S208: the processor 104 outputs the temperature sensing result RST_1 to the charging control circuit 116.

Step S210: the switch module 118 conducts electric current between the thermistor 112 and the charging control circuit 116, and the charging control circuit 116 determines the temperature sensing result RST_2 according to the resistance of the thermistor 112.

Step S212: the charging control circuit 116 controls how the charging circuit 108 charges the rechargeable battery 106 to appropriately adjust charging currents flowing into the rechargeable battery 106.

The rechargeable battery temperature detection process 20 is an operation method of the power management device 110 by which the switch module 118 can alternately conduct electric current between the thermistor 112 and the fuel gauge 114 or between the thermistor 112 and the charging control circuit 116 corresponding to different states of the processor 104. When the processor 104 is operated in a working state, the switch module 118 conducts electric current between the thermistor 112 and the fuel gauge 114, such that the fuel gauge 114 can determine the temperature sensing result RST_1 according to the resistance of the thermistor 112. The fuel gauge 114 sends a measured charge storage capacity of the rechargeable battery 106 and the temperature sensing result RST_1 to the processor 104, and the processor 104 further transmits the temperature sensing result RST_1 to the charging control circuit 116. Therefore, the charging control circuit 116 can control how the charging circuit 108 charges the rechargeable battery 106. When the processor 104 is not operated in a working state, the switch module 118 conducts electric current between the thermistor 112 and the charging control circuit 116, such that the charging control circuit 116 can determine the temperature sensing result RST_2 according to the resistance of the thermistor 112 and accordingly control how the charging circuit 108 charges the rechargeable battery 106. Please note that voltages of the temperature sensing results RST_1 and RST_2 may be the same; nevertheless, the present invention is not limited thereto and the voltages of the temperature sensing results RST_1 and RST_2 may differ according to system requirements or design considerations. Furthermore, when the temperature sensing results RST_1 and RST_2 indicate that the temperature of the rechargeable battery 106 is too high or too low, the charging control circuit 116 may force the charging circuit 108 to reduce the charging current flowing to the rechargeable battery 106 or even to stop charging the rechargeable battery 106 to ensure charging safety.

Please note that the electronic system 10 in FIG. 1 or the rechargeable battery temperature detection process 20 in FIG. 2 are embodiments of the invention; however, the present invention is not limited thereto, and those skilled in the art might make modifications or alterations accordingly. For example, the switch module 118 detects the state signals STATE_1, STATE_2 of the processor 104 via a pin of the processor 104 so as to determine whether the processor 104 is operated in a working state. The state signals STATE_1 and STATE_2 may be different voltage levels provided on one pin of the processor 104; for example, the state signals STATE_1 and STATE_2 may respectively be a high voltage level and a low voltage level. In the electronic system 10, the thermistor 106 may be a negative temperature coefficient (NTC) thermistor or a positive temperature coefficient (PTC) thermistor, but is not limited herein; any component where the resistance varies with temperature can serve as a thermistor. Moreover, since the external power Ext_Power can be an AC power or a DC power, the power conversion module 102 can be an AC-to-DC converter or a DC-to-DC converter in order to covert the external power Ext_Power into a proper DC power DC_Power, but is not limited thereto. The rechargeable battery 106 can be a lithium-ion battery, a Nickel-cadmium (NiCd) battery, a Nickel-metal hydride (NiMH) battery, etc., but is not limited herein; the rechargeable battery 106 can also be any other rechargeable battery. The processor 104 can be a microcontroller, a digital signal processor (DSP), a field-programmable gate array (FPGA), a complex programmable logic device (CPLD), an application specific integrated circuit (ASIC) or a central processor unit (CPU), but is not limited thereto. The electronic system 10 can be various electronic devices such as a smart phone, a personal digital assistant (PDA) or a laptop, but is not limited thereto.

The switch module 118 is utilized to switch electrical connections from a connection between the thermistor 112 and the fuel gauge 114 to a connection between the thermistor 112 and the charging control circuit 116, and vice versa, but may be implemented in any other approach or structure. For example, the switch module 118 may be a double-pole double-throw (DPDT) digital switch or a dual single-pole double-throw (SPDT) digital switch and may be further modified according to different system requirements or design considerations. Please refer to FIG. 3, which is a schematic diagram illustrating the switch module 118 according to an embodiment of the invention. The switch module 118 comprises single-pole double-throw switches 318a and 318b, and different numerals denote different pins. Specifically, a pin 11 of the single-pole double-throw switch 318a is electrically connected to the thermistor 112. Pins 2 and 9 are electrically connected to the fuel gauge 114 and the charging control circuit 116, respectively. Electric currents are conducted between the thermistor 112 and the fuel gauge 114 when a pin 1 detects the state signal STATE_1 from the processor 104. Alternatively, electric currents are conducted between the thermistor 112 and the charging control circuit 116 when the pin 1 detects the state signal STATE_2 from the processor 104. When a pin 5 of the single-pole double-throw switch 318b detects the state signals STATE_1 and STATE_2, the charging control circuit 116 electrically connected to pin 4 and the fuel gauge 114 electrically connected to pin 7 are grounded through a resistor 320 electrically connected to a pin 6. The resistor 320 may be omitted according to different system requirements and the pin 6 is thus grounded directly.

Figure 4:
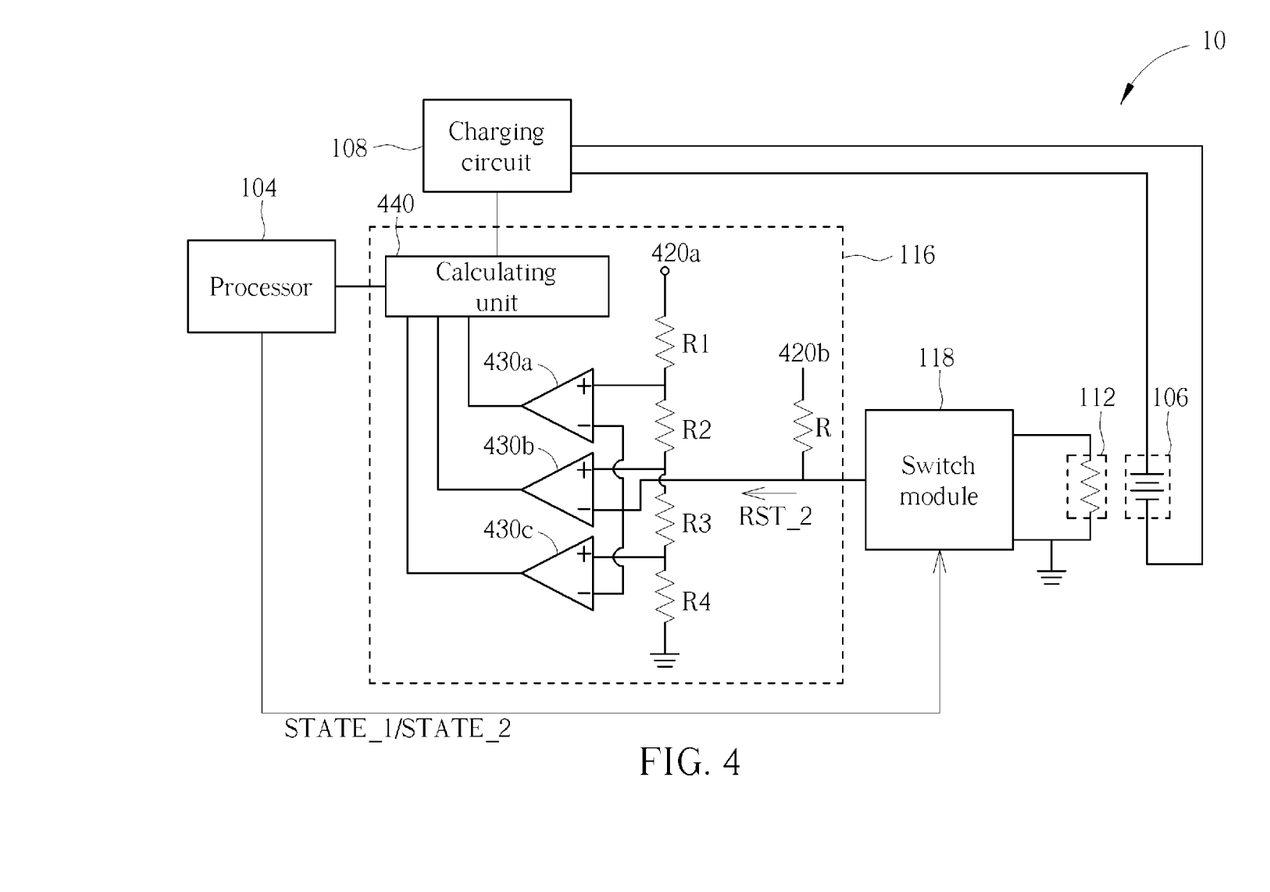
FIG. 4 is a schematic diagram illustrating a charging control circuit according to an embodiment of the invention.

The charging control circuit 116 is utilized to determine the temperature sensing result RST_2 according to the resistance of the thermistor 112, but may be implemented in any other approach or structure. For example, please refer to FIG. 4, which is a schematic diagram illustrating the charging control circuit 116 according to an embodiment of the invention. The charging control circuit 116 comprises power sources 420a, 420b, resistors R, R_1-R_4, comparators 430a-430c and a calculating unit 440. The resistors R_1-R_4 are connected in series between the power source 420a of voltage value VDD1 and a grounding terminal and respectively have resistances r1, r2, r3 and r4. The resistors R_1-R_4, which serve as a voltage divider, can provide voltage values $$\frac{r2+r3+r4}{r1+r2+r3+r4} \cdot VDD1, \frac{r3+r4}{r1+r2+r3+r4} \cdot VDD1,$$

$$\frac{r4}{r1+r2+r3+r4} \cdot VDD1$$

for positive input terminals of the comparators 430a-430c, respectively. When the switch module 118 conducts electric current between the thermistor 112 and the charging control circuit 116, the resistor R and the thermistor 112 of a negative temperature coefficient are connected in series between the power source 420b of voltage value VDD2 and a grounding terminal, and respectively have resistances r and r112. The resistor R and the thermistor 112, which serve as another voltage divider, can provide voltage value $$\frac{r112}{r+r112} \cdot VDD2$$

for negative input terminals of the comparators 430a-430c.

The comparators 430a-430c send results to the calculating unit 440, and the calculating unit 440 transmits the calculated temperature sensing result RST_2 to the charging circuit 108. The voltage ratio of the resistors R_1-R_4 can be adjusted according to various system requirements; for example, values $$\frac{r2+r3+r4}{r1+r2+r3+r4} \cdot VDD1, \frac{r3+r4}{r1+r2+r3+r4} \cdot VDD1,$$

$$\frac{r4}{r1+r2+r3+r4} \cdot VDD1$$

may be in a ratio of 73.5:47.2:44.7. As a result, if $$\frac{r112}{r+r112} \cdot VDD2$$

is less than $$\frac{r4}{r1+r2+r3+r4} \cdot VDD1,$$

this means that the temperature of the rechargeable battery 106 is too high and the charging circuit 108 should reduce the charging current flowing into the rechargeable battery 106 immediately, or even stop charging the rechargeable battery 106, to ensure charging safety. If $$\frac{r112}{r+r112} \cdot VDD2$$

is within a range of $$\frac{r4}{r1+r2+r3+r4} \cdot VDD1$$

to $$\frac{r3+r4}{r1+r2+r3+r4} \cdot VDD1,$$

this means that the temperature of the rechargeable battery 106 is quite high and an alert signal may be output. If $$\frac{r112}{r+r112} \cdot VDD2$$

is within a range of $$\frac{r3+r4}{r1+r2+r3+r4} \cdot VDD1,$$

to $$\frac{r2+r3+r4}{r1+r2+r3+r4} \cdot VDD1,$$

this means that the temperature of the rechargeable battery 106 is normal. In this case, the rechargeable battery 106 will still be charged, and the charging current may even increase. If $$\frac{r112}{r+r112} \cdot VDD2$$

is greater than $$\frac{r2+r3+r4}{r1+r2+r3+r4} \cdot VDD1,$$

this means that the temperature of the rechargeable battery 106 is low, in which case the charging circuit 108 can reduce the charging current flowing into the rechargeable battery 106 or even stop charging the rechargeable battery 106. Therefore, based on the relation between the resistance of the thermistor 112 and the temperature of the rechargeable battery 106, those skilled in the art may adjust the ratio of the resistances of the resistors R, R_1-R_4 so that the charging control circuit 116 can accurately control the charging method of the charging circuit 108.

Figure 5:
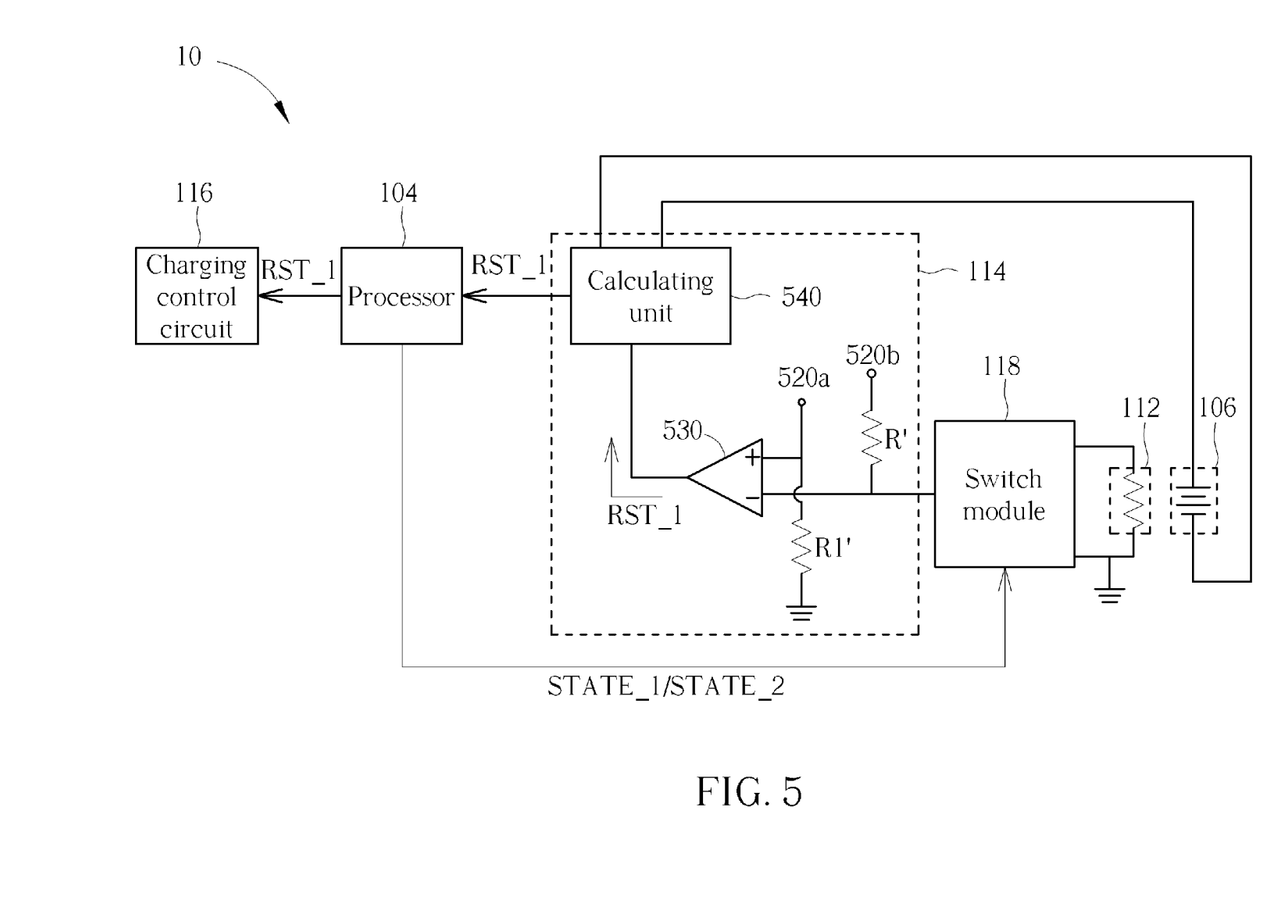
FIG. 5 is a schematic diagram illustrating a fuel gauge according to an embodiment of the invention.

The fuel gauge 114 is utilized to determine the temperature sensing result RST_1 according to the resistance of the thermistor 112, but may be implemented in any other approach or structure. For example, please refer to FIG. 5, which is a schematic diagram illustrating the fuel gauge 114 according to an embodiment of the invention. The fuel gauge 114 comprises power sources 520a, 520b, resistors R', R_1', a comparator 530 and a calculating unit 540. The power source 420a can provide a voltage value VDD1' to a positive input terminal of the comparator 530. When the switch module 118 conducts electric current between the thermistor 112 and the fuel gauge 114, the resistor R' and the thermistor 112 are connected in series between the power source 520b of voltage value VDD2' and a grounding terminal, and respectively have resistances r' and r112. The resistor R' and the thermistor 112, which serves as another voltage divider, can provide a voltage value $$\frac{r112}{r'+r112} \cdot VDD2$$

to a negative input terminal of the comparator 530. The comparator 530 sends results to the calculating unit 540, and the calculating unit 540 transmits the calculated temperature sensing result RST_1 to the processor 104. The temperature sensing result RST_1 and the temperature of the rechargeable battery 106 can then be determined according to the resistance of the thermistor 112.

Figure 3:
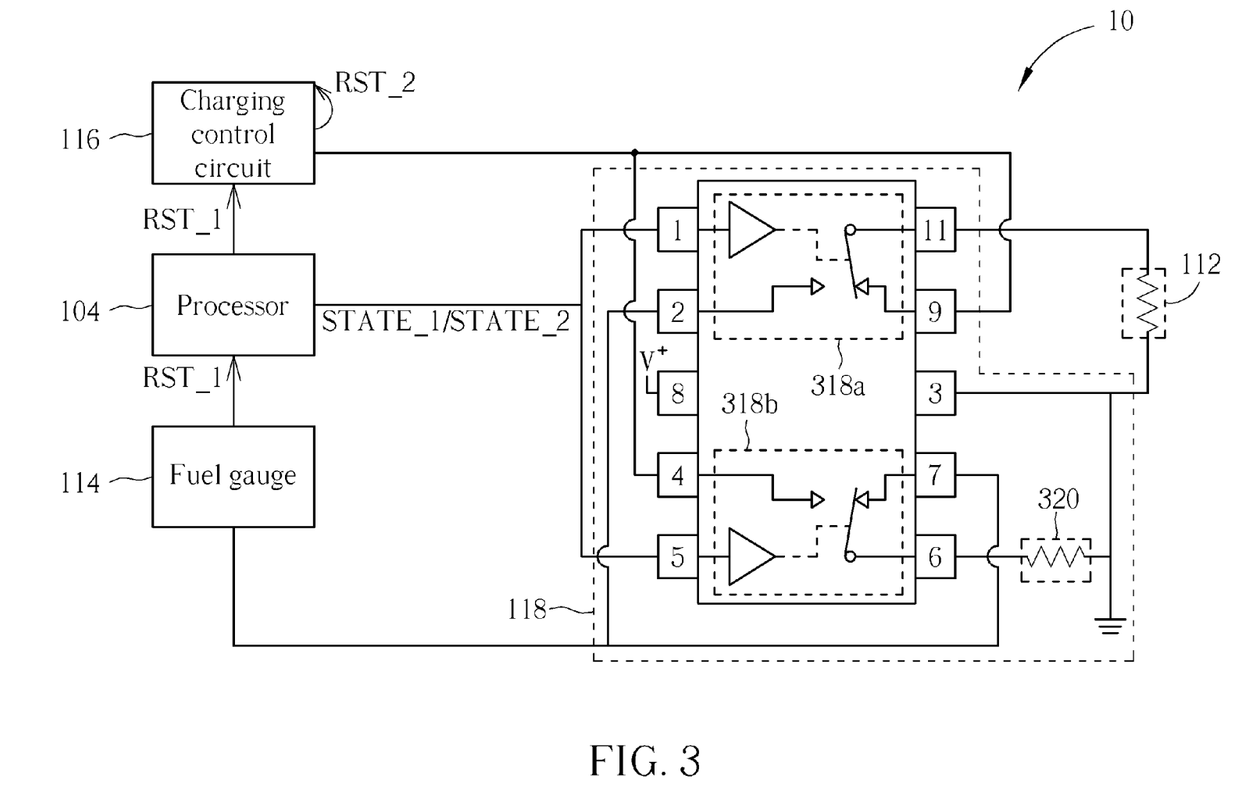
FIG. 3 is a schematic diagram illustrating a switch module according to an embodiment of the invention.

FIGS. 3 to 5 are, respectively, embodiments of the switch module 118, the charging control circuit 116 and the fuel gauge 114 in the power management device 110; however, the present invention is not limited to the illustrated embodiments. Those skilled in the art may adjust the implementation of the power management device 110 according to system requirements to alternatively connect the thermistor 112 to the fuel gauge 114 or the charging control circuit 116 so as to ensure charging safety and save power.

In the prior art, temperature sensing results detected by a fuel gauge must be ceaselessly transmitted to a charging control circuit through a processor. As a result, when the processor cannot be executed normally, charging safety will be put at risk. In contrast, even when the processor 104 of the present invention does not operate normally or even when the electronic system 10 is operated in a sleeping or a shutdown state, because the switch module 118 conducts electric currents between the thermistor 112 and the charging control circuit 116, the charging control circuit 116 can still obtain the temperature sensing result RST_2 and accordingly control the charging circuit 108 to appropriately adjust the charging current, thereby assuring charging safety and saving power.

To sum up, electric currents are conducted between the thermistor and the charging control circuit or between the thermistor and the fuel gauge according to states of the processor, thereby assuring charging safety and saving power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rechargeable battery temperature detection method, adapted to an electronic system, comprising:
   detecting a state of a processor of the electronic system when an external power is input to a power conversion module of the electronic system; and
   determining that a switch module switches a thermistor to either a fuel gauge or a charging control circuit according to the state of the processor during charging, such that the fuel gauge or the charging control circuit is able to determine a temperature sensing result via the thermistor;
   wherein the thermistor is disposed adjacent to a rechargeable battery and has a resistance which varies with a temperature of the rechargeable battery, and the temperature sensing result is related to the resistance.

2. The rechargeable battery temperature detection method according to claim 1, wherein the step of determining whether electric currents are conducted between the thermistor of the electronic system and the fuel gauge or between the thermistor and the charging control circuit according to the state of the processor comprises:
   conducting electric currents between the thermistor and the fuel gauge when the processor is operated in a working state, wherein the fuel gauge determines the temperature of the rechargeable battery according to the resistance of the thermistor and thereby determines the temperature sensing result.

3. The rechargeable battery temperature detection method according to claim 2, further comprising:
   utilizing the fuel gauge to transmit the temperature sensing result to the processor, wherein the processor controls how a charging circuit charges the rechargeable battery according to the temperature sensing result.

4. The rechargeable battery temperature detection method according to claim 1, wherein the step of determining whether electric currents are conducted between the thermistor of the electronic system and the fuel gauge or between the thermistor and the charging control circuit according to the state of the processor comprises:
   conducting electric currents between the thermistor and the charging control circuit when the processor is not operated in a working state, wherein the charging control circuit determines the temperature of the rechargeable battery according to the resistance of the thermistor and thereby determines the temperature sensing result.

5. The rechargeable battery temperature detection method according to claim 4, further comprising:
   utilizing the charging control circuit to adjust how a charging circuit charges the rechargeable battery according to the temperature sensing result.

6. The rechargeable battery temperature detection method according to claim 4, wherein when the electronic system is operated in a state selected from a sleeping state, a shutdown state and a crashed state, the processor is not operated in the working state.

7. The rechargeable battery temperature detection method according to claim 1, wherein the thermistor is a negative temperature coefficient (NTC) thermistor or a positive temperature coefficient (PTC) thermistor.

8. A power management device, adapted to an electronic system, comprising:
   a thermistor, disposed adjacent to a rechargeable battery of the electronic system and having a resistance which varies with a temperature of the rechargeable battery;
   a fuel gauge, configured to calculate a charge storage capacity of the rechargeable battery and determine a temperature sensing result according to the resistance of the thermistor;
   a charging control circuit, configured to control how a charging circuit charges the rechargeable battery and determine the temperature sensing result according to the resistance of the thermistor; and
   a switch module, coupled between the thermistor, the fuel gauge and the charging control circuit and configured to switch a thermistor to either a fuel gauge or a charging control circuit according to a state of a processor of the electronic system during charging, such that the fuel gauge or the charging control circuit is able to determine the temperature sensing result via the thermistor.

9. The power management device according to claim 8, wherein when the processor is operated in a working state, the switch module conducts electric currents between the thermistor and the fuel gauge, wherein the fuel gauge determines the temperature of the rechargeable battery according to the resistance of the thermistor and thereby determines the temperature sensing result.

10. The power management device according to claim 9, wherein the fuel gauge is further configured to transmit the temperature sensing result to the processor, wherein the processor controls how the charging circuit charges the rechargeable battery according to the temperature sensing result.

11. The power management device according to claim 8, wherein when the processor is not operated in a working state, the switch module conducts electric currents between the thermistor and the charging control circuit, wherein the charging control circuit determines the temperature of the rechargeable battery according to the resistance of the thermistor and thereby determines the temperature sensing result.

12. The power management device according to claim 11, wherein the charging control circuit is further configured to adjust how the charging circuit charges the rechargeable battery according to the temperature sensing result.

13. The power management device according to claim 11, wherein when the electronic system is operated in a state selected from a sleeping state, a shutdown state and a crashed state, the processor is not operated in the working state.

14. The power management device according to claim 8, wherein the switch module is further configured to determine the state of the processor according to a state signal of the processor.

15. The power management device according to claim 8, wherein the charging control circuit comprises:
- a first resistor, electrically connected between the charging circuit and a first voltage source;
- a serial resistor, electrically connected between a second voltage source and a grounding terminal and comprising a plurality of resistors connected in series, wherein resistances of the plurality of resistors respectively relates to the resistance of the thermistor; and
- a plurality of comparators, wherein each comparator of the plurality of comparator comprises a positive input terminal electrically connected between two adjacent resistors of the plurality of resistors, a negative input terminal coupled between the switch module and the first resistor, and an output terminal coupled to the charging circuit.

16. The power management device according to claim 8, wherein the thermistor is a negative temperature coefficient (NTC) thermistor or a positive temperature coefficient (PTC) thermistor.

17. An electronic system, comprising:
- a power conversion module, configured to output a direct current (DC) voltage;
- a processor;
- a rechargeable battery;
- a charging circuit, configured to receive the DC voltage from the power conversion module and provide a charging current for the rechargeable battery; and
- a power management device, comprising:
  - a thermistor, disposed adjacent to the rechargeable battery and having a resistance which varies with a temperature of the rechargeable battery;
  - a fuel gauge, configured to calculate a charge storage capacity of the rechargeable battery and determine a temperature sensing result according to the resistance of the thermistor;
  - a charging control circuit, configured to control how the charging circuit charges the rechargeable battery and determine the temperature sensing result according to the resistance of the thermistor; and
  - a switch module, coupled between the processor, the thermistor, the fuel gauge and the charging control circuit and configured to switch a thermistor to either a fuel gauge or a charging control circuit according to a state of the processor during charging, such that the fuel gauge or the charging control circuit is able to determine the temperature sensing result via the thermistor.

18. The electronic system according to claim 17, wherein when the processor is operated in a working state, the switch module conducts electric currents between the thermistor and the fuel gauge, wherein the fuel gauge determines the temperature of the rechargeable battery according to the resistance of the thermistor and thereby determines the temperature sensing result.

19. The electronic system according to claim 18, wherein the fuel gauge is further configured to transmit the temperature sensing result to the processor, wherein the processor controls how the charging circuit charges the rechargeable battery according to the temperature sensing result.

20. The electronic system according to claim 17, wherein when the processor is not operated in a working state, the switch module conducts electric currents between the thermistor and the charging control circuit, wherein the charging control circuit determines the temperature of the rechargeable battery according to the resistance of the thermistor and determines the temperature sensing result.

21. The electronic system according to claim 20, wherein the charging control circuit is further configured to adjust how the charging circuit charges the rechargeable battery according to the temperature sensing result.

22. The electronic system according to claim 20, wherein when the electronic system is operated in a state selected from a sleeping state, a shutdown state and a crashed state, the processor is not operated in the working state.

23. The electronic system according to claim 17, wherein the switch module is further configured to determine the state of the processor according to a state signal of the processor.

24. The electronic system according to claim 17, wherein the charging control circuit comprises:
- a first resistor, electrically connected between the charging circuit and a first voltage source;
- a serial resistor, electrically connected between a second voltage source and a grounding terminal and comprising a plurality of resistors connected in series, wherein resistances of the plurality of resistors respectively relates to the resistance of the thermistor; and
- a plurality of comparators, wherein each comparator of the plurality of comparator comprises a positive input terminal electrically connected between two adjacent resistors of the plurality of resistors, a negative input terminal coupled between the switch module and the first resistor, and an output terminal coupled to the charging circuit.

25. The electronic system according to claim 17, wherein the thermistor is a negative temperature coefficient (NTC) thermistor or a positive temperature coefficient (PTC) thermistor.

* * * * *